United States Patent [19]
Vuillemin (Müller) et al.

[11] Patent Number: 6,114,788
[45] Date of Patent: Sep. 5, 2000

[54] MOTOR/ACTIVE MAGNETIC BEARING COMBINATION STRUCTURE

[75] Inventors: Ronald Hendrik Vuillemin (Müller), Markdorf, Germany; Hiroshi Toshiyoshi, Kanagawa, Japan; Hannes Bleuler, Denges, Switzerland

[73] Assignee: Seagate Technology L.L.C., Scotts Valley, Calif.

[21] Appl. No.: 08/988,290

[22] Filed: Dec. 10, 1997

Related U.S. Application Data

[60] Provisional application No. 60/032,537, Dec. 10, 1996.

[51] Int. Cl.$^7$ .............................. H02K 7/09; H02K 21/12; H02K 1/00; H02K 1/22
[52] U.S. Cl. .................. 310/90.5; 310/156; 310/181; 310/268
[58] Field of Search .......................... 310/90.5, 46, 156, 310/181, 254, 268, 154, 152; 322/46; 335/229

[56] References Cited

U.S. PATENT DOCUMENTS

| | | | |
|---|---|---|---|
| 4,000,929 | 1/1977 | Studer | 308/10 |
| 4,065,189 | 12/1977 | Sikorra | 310/90.5 |
| 4,634,191 | 1/1987 | Studer | 310/90.5 |
| 4,717,266 | 1/1988 | Hart, Jr. et al. | 310/90.5 |
| 5,177,387 | 1/1993 | McMichael et al. | 310/90.5 |
| 5,314,868 | 5/1994 | Takahata et al. | 505/166 |
| 5,345,128 | 9/1994 | Pinkerton et al. | 310/90.5 |
| 5,436,516 | 7/1995 | Yamazaki et al. | 310/90.5 |
| 5,682,071 | 10/1997 | Buhler et al. | 310/90.5 |
| 5,894,181 | 4/1999 | Imlach | 310/90.5 |

OTHER PUBLICATIONS

Bleuler, et al., "Micromachined Active Magnetic Bearings", Fourth International Symposium on Magnetic Bearings, Aug. 1994, ETH Zurich, pp. 349–352.

Schöb, "Principle and Application of a Bearingless Slice Motor", Fifth International Symposium on Magnetic Bearings, Kanazawa, Japan, Aug. 1996, pp. 313–318.

Komori, "Development of a Millimeter-sized Active Magnetic Bearing System", Fifth International Symposium on Magnetic Bearings, Kanazawa, Japan, Aug. 1996, pp. 405–410.

*Primary Examiner*—Nestor Ramirez
*Assistant Examiner*—Dang Dinh Le
*Attorney, Agent, or Firm*—Flehr Hohbach Test Albritton & Herbert LLP

[57] ABSTRACT

A motor/active magnetic bearing combination includes two stator base plates made of magnetic material. A plurality of sets of north and south poles, numbering at least three are formed on each of the stators, and each set comprises one or two south poles and a north pole or vice versa. Appropriate energization of the coils surrounding each of these poles both suspends and creates a magnetic field which imposes a constant speed rotation on the rotor which is suspended between the stators. The rotation is achieved by virtue of the fact that the rotor includes a circumferential set of slots defining regions around the circumference which interact with the energized poles on the stator so that a reluctance motor is formed, driving the rotor in rotation.

12 Claims, 11 Drawing Sheets

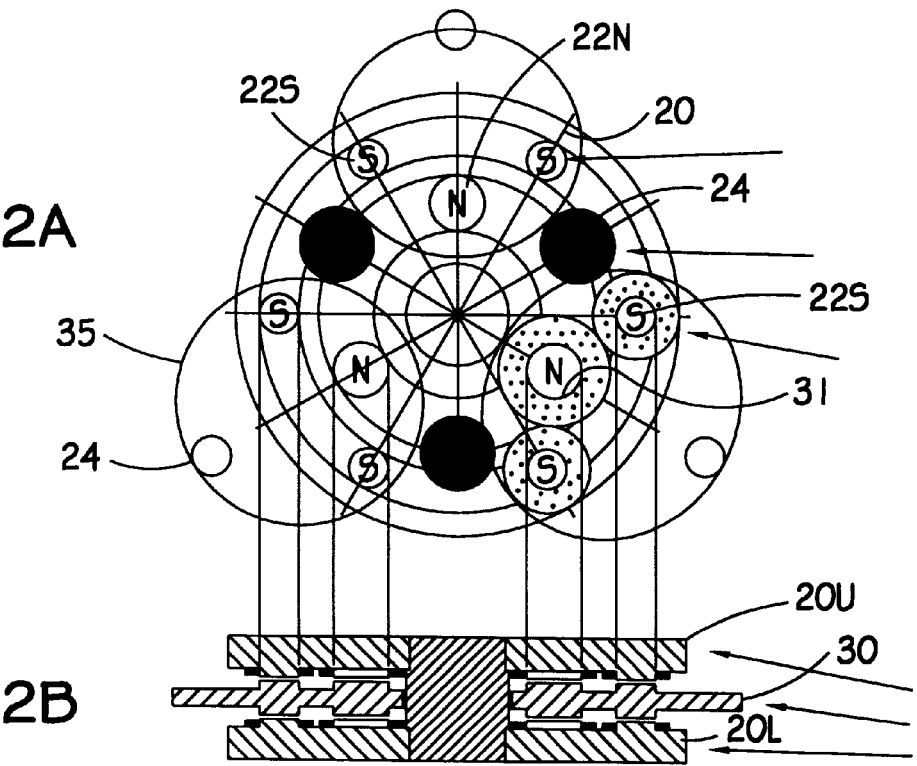
FIG. 2A
FIG. 2B
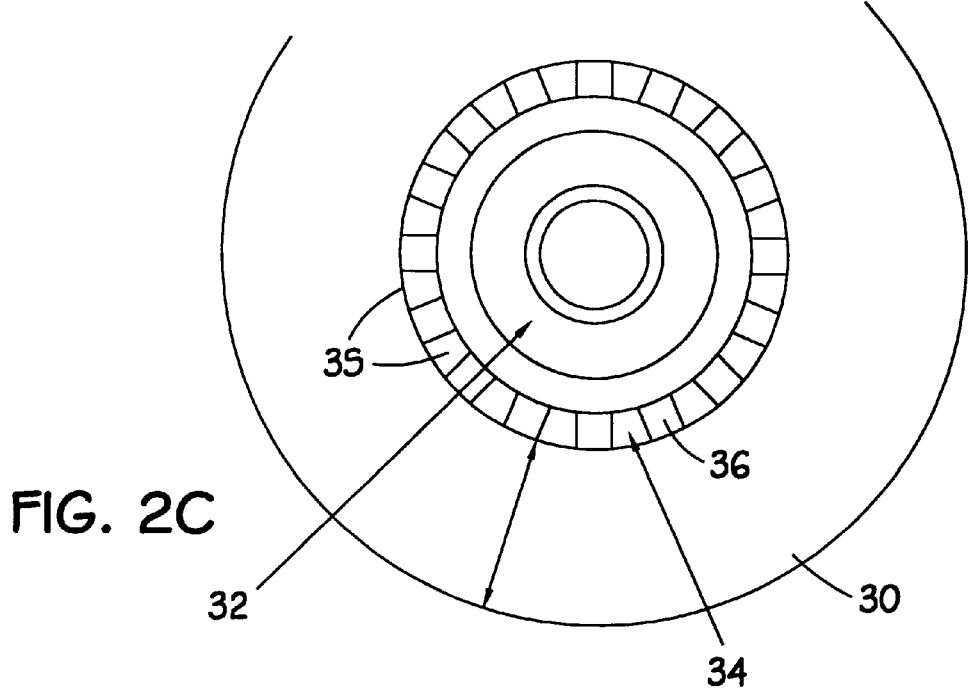
FIG. 2C

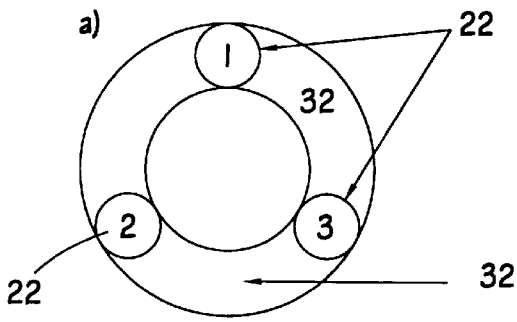
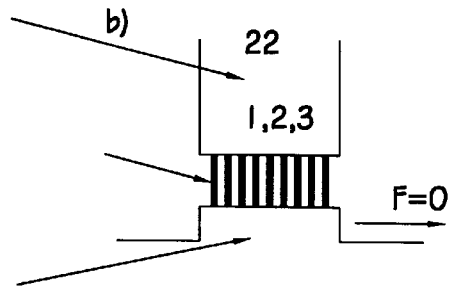
FIG. 5D
FIG. 5E
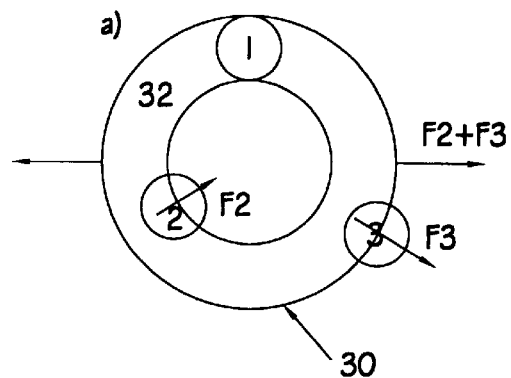
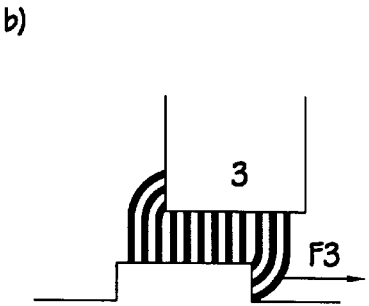
FIG. 5F
FIG. 5G

MOTOR/ACTIVE MAGNETIC BEARING COMBINATION STRUCTURE

CROSS-REFERENCE TO RELATED APPLICATION

This application is based on U.S. Provisional Patent Application, Serial No. 60/032,537 filed Dec. 10, 1996, assigned to the assignee of this application and incorporated herein by reference the priority of which is claimed.

FIELD OF THE INVENTION

The invention relates generally to magnetic bearings and more particularly to a magnetic bearing providing two functions, a contact-free magnetic suspension, and an electric motor drive.

BACKGROUND OF THE INVENTION

It has long been desirable to establish a system for supporting and controlling the position, angular orientation, and rotational speed of an object with minimal or without any physical contact to eliminate wear or frictional effect. Such a suspension and control system would have important uses in high-speed rotating devices such as disc drives; however, it also has applicability to robotic joints, the suspension and support of optical elements and other systems where precision of position and orientation control are required.

Conventional mechanical bearings have limitations of limited lifetime, need for lubrication, and performance limitations due to nonlinear frictional characteristics. Hydrodynamic bearings provide a dramatic improvement over such mechanical bearings, but present problems in terms of the needs to maintain the fluid within the bearing gap. Therefore, magnetic bearings have been considered as a solution to these problems.

A number of prior art magnetic bearings have been disclosed, typically utilizing passive methods for restraint. Such passive methods are typically less precise and are very fixed by the initial design, and are therefore less versatile and are inherently limited in their applicability. A number of active magnetic bearings have also been disclosed, including those in U.S. Pat. Nos. 4,000,929 and 4,634,191. The designs disclosed therein, however, comprise a circular stator member cooperating with a suspended annular ring member having radially inward facing pole faces. The flux coils supported on the stator provide variable flux density along radial paths to provide active radial stabilization; flux coils on the stator produce torque moments imposed on the annular ring. However, the entire design is of substantial size and would not lend itself to either small or precisely-controlled systems.

SUMMARY OF THE INVENTION

It is an object of this invention to provide a new and improved magnetic bearing.

Another object of the invention is to provide a new and improved magnetic bearing for adjusting and maintaining and controlling the radial position of a suspended member in a magnetic bearing even during the occurrence of static and/or dynamic disturbances.

A further objective of the invention is to provide an active magnetic bearing which provides contact-free magnetic suspension of a suspended member as well as electric motor drive to the suspended member, whether it be rotary or linear, reluctance, synchronous, or stepping motor type. The motor/active magnetic bearing structure can be either reluctance or permanent magnet type. In fact, in the description to be given below, the word "rotor" can be used to indicate a suspended member of object in both bases of rotary and linear motion.

Another objective of the invention is to provide an active magnetic bearing structure, which facilitates batch fabrication and optimum miniaturization.

These and other objectives of the present invention are achieved by a motor/active magnetic bearing combination including two stator base plates made of magnetic material. A plurality of poleshoes for supporting coils are incorporated into each plate. The plates are arranged on either side of the rotor which is suspended between the stators; the stators create reluctance forces by which the motor is suspended. Direction of magnetization created by currents through the active magnetic bearing coils remain constant over the rotor over one complete rotation.

According to a preferred embodiment of the invention, a plurality of sets of north and south poles, numbering at least three are formed on each of the stators, and each set comprises one or two south poles and a north pole or vice versa. Appropriate energization of the coils surrounding each of these poles both suspends and creates a magnetic field which imposes a constant speed rotation on the rotor. The rotation is achieved by virtue of the fact that the rotor includes a circumferential set of slots defining regions around the circumference which interact with the energized poles on the stator so that a reluctance motor is formed, driving the rotor in rotation.

Other features and advantages of the invention will be apparent to a person of skill in this field who studies the following description of a preferred embodiment given with reference to the following drawings.

BRIEF DESCRIPTION OF THE DRAWINGS

FIGS. 2 is a schematic drawing of an active bearing/motor combination.

FIG. 5A–5G are schematic diagrams which illustrate the relationship between the rotor and stator in establishing an active magnetic bearing and in creating torque on the rotor.

DETAILED DESCRIPTION OF A PREFERRED EMBODIMENT

Figure 1:
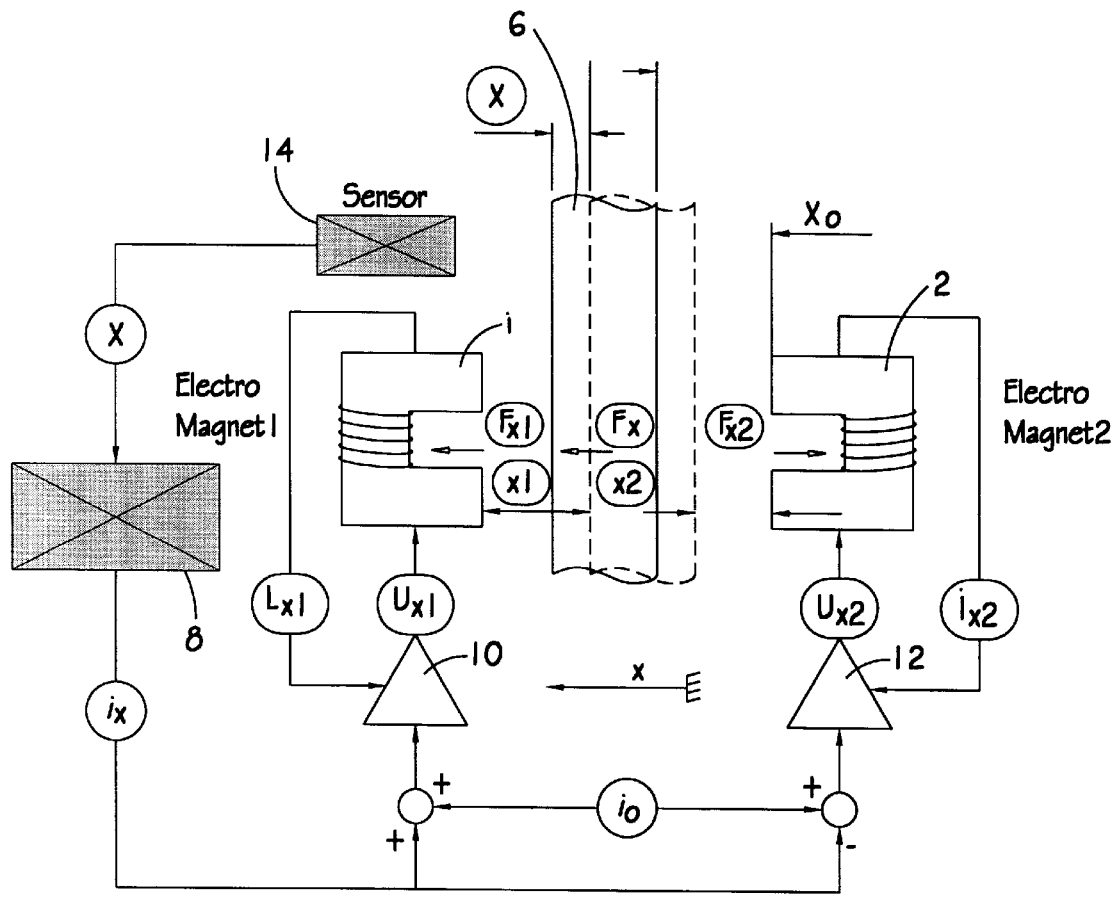
FIG. 1 is a schematic of an active magnetic bearing system.

With reference to the drawings, FIG. 1 shows in basic schematic format the set-up of an active magnetic bearing system. In this figure, the basic elements comprise first and second electromagnets 1,2 and a rotor 6. To keep the rotor 6 stabilized between the two electromagnets 1,2 a controller 8 applied signals through a pair of power amplifiers 10,12 to the coils of each of the electromagnets 1,2. It is these currents which stabilize the position of the suspended object between the eletromagnets. The active feedback control for maintaining the position is based on a feedback signal which is usually the function of the position of the rotor 6 between the two electromagnets 1,2 as detected by the sensor 14. The following equations govern the positioning of the rotor 6 between the electromagnets:

$$x_1 = x_o - xi_{x,1} = i_o + i_x$$

$$x_2 = x_o + xi_{x,2} = i_o - i_x$$

$$F_{x,1} = \frac{K \cdot i_1^2}{4 \cdot x_1^2} \quad F_{x,2} = \frac{K \cdot i_2^2}{4 \cdot x_2^2}$$

$$F_{x,1} \sim \frac{L_1^2}{X_1^2} \quad F_{x,2} \sim \frac{L_2^2}{X_2^2}.$$

$$F_x = F_{x,1} - F_{x,2} + F_{x,dist}$$

where K depends on pole configuration.
Definitions:

$x_1$, $x_2$: air gaps between rotor and electromagnets 1,2

$x_o$: initial air gap during operation $x$ : deviation from initial position $i_{x,1}$, $i_{x,2}$ : current in electro electromagnets 1,2

$i_o$: bias current $i_x$: control current u: voltage on coils for electro magnets 1,2

$F_{x,1}$, $F_{x,2}$: attractive force from electromagnets 1,2 on rotor $F_x$: sum of all forces in one degree of freedom acting on rotor $F_{x,dist}$: disturbance force $L_1$, $L_2$: inductance of the magnetic circuits Continuing with an explanation of the design of the present invention, reference is next made to FIGS. 2A, 2B and 2C which illustrate the basic elements of a complete active bearing motor setup consistent with this invention. More specifically, FIG. 2A is a top view of an exemplary embodiment of the invention, including a circular stator including a plurality of poles 22 and sensors 24; FIG. 2B is a side view cut through along the axis of rotation, showing the upper stator 20U, the rotor 30, and the lower stator 20L. The upper and lower stator are given the same reference number because they are designed according to the same principles and will typically be almost mirror images of each other so that their sets of magnetic poles are axially aligned in order to establish the necessary magnetic flux passing across the gap and maintaining the rotor 30 suspended between them. FIG. 2C is a plane view of the rotor 30 showing both an inner ring 32 which is of a ferromagnetic material to interact with the magnetic poles at the inner radius of the stators to maintain the suspension of the rotor, and an outer ring 34 in which slots or their regions 36 separating the thicker regions 37 of magnetic materials have been formed so that torque can be generated by means of variation in the bias current flowing through the opposed coils on the stators, especially the poles 22, on the outer radius.

The basic idea behind this design is that over one complete rotation of the rotor 30, the inner ring 32 of magnetic material sees only one direction of the flux, being aligned with the north poles 22N; and similarly, over one complete 360° rotation of the rotor, the outer ring 34 of magnetic material which provides both suspension and the drive function, sees only one direction of the flux being radially aligned with the south poles 22S; the variations in bias current through these coils cause rotation of rotor 30. More specifically, the motor/active magnetic bearing combination includes the two stator base plates 20U and 20L which are made of ferromagnetic material. A number of poleshoes are incorporated into each of these plates, the poleshoes being labeled 22S, 22N based on their magnetic orientation. Around these poleshoes, coils 31 are wound, preferably flat spiral-shaped coils for the generation of the necessary magnetic fields.

As shown in FIG. 2A, the electromagnets are arranged in groups 35 and a minimum of three groups are provided on each stator, with the magnets on the stators facing each other and being radially aligned. The electromagnets in each group 35 have two poleshoes 22S at a constant outer radius, and a poleshoe 22N on an inner radius.

Because these stator plates are carrying symmetrically-arranged magnets, and are arranged on each side of the rotor 30, they create reluctance forces to interact with magnetic regions 32, 34 on the rotor which keep the rotor suspended in a stable position both axially and radially. The slots in the outer ring 34 of the rotor 30 are used to create the torque to drive the rotor in rotation, using this configuration, a maximum torque can be achieved without decreasing the low capacity of the bearing by very much.

Figure 3:
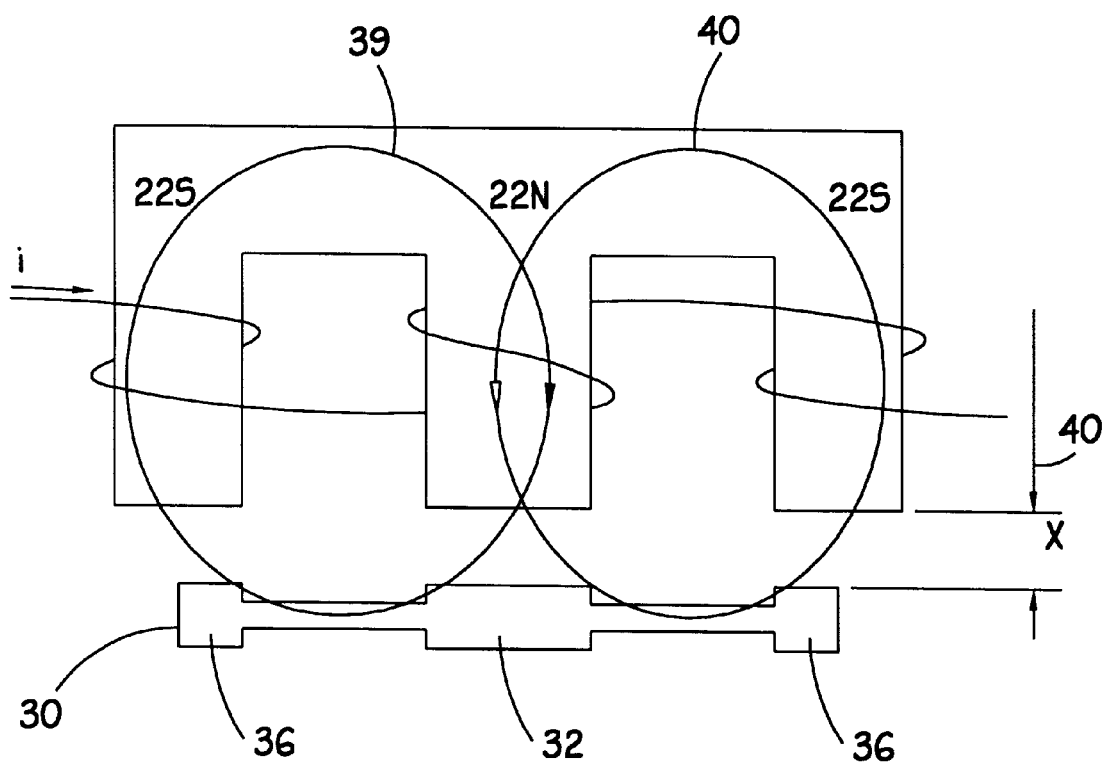
FIG. 3 illustrates the windings used to establish the electromagnets, as well as the flux paths created.

The energization of the electromagnets 22 mounted on each of the circular stators 20 as well as the flux paths created is illustrated in FIG. 3. As shown therein, each set 35 of three electromagnets which are polarized as shown in FIG. 2A and are represented by 22S and 22N, can be energized by a single current, with a polarity fixed by the direction of winding of the current about the pole. The area of the poleshoe at the inner radius (or north radius) 22N which in this example is solely for suspension purposes is preferably four times the area of each of the two poleshoes 22 which are used for both suspension and to create the drive for rotation. The flux which is developed by these electromagnets is indicated by the arrows 39, 40 showing the circulation through each of the poles and through the slots 36 in the outer ring of the stator. The separation between the stator poles and the rotor is represented by the distance X,40. Of course, although the second stator 20 and its poles is not shown, as taught with respect to FIG. 2, there is a stator on either side of the rotor.

Figure 4:
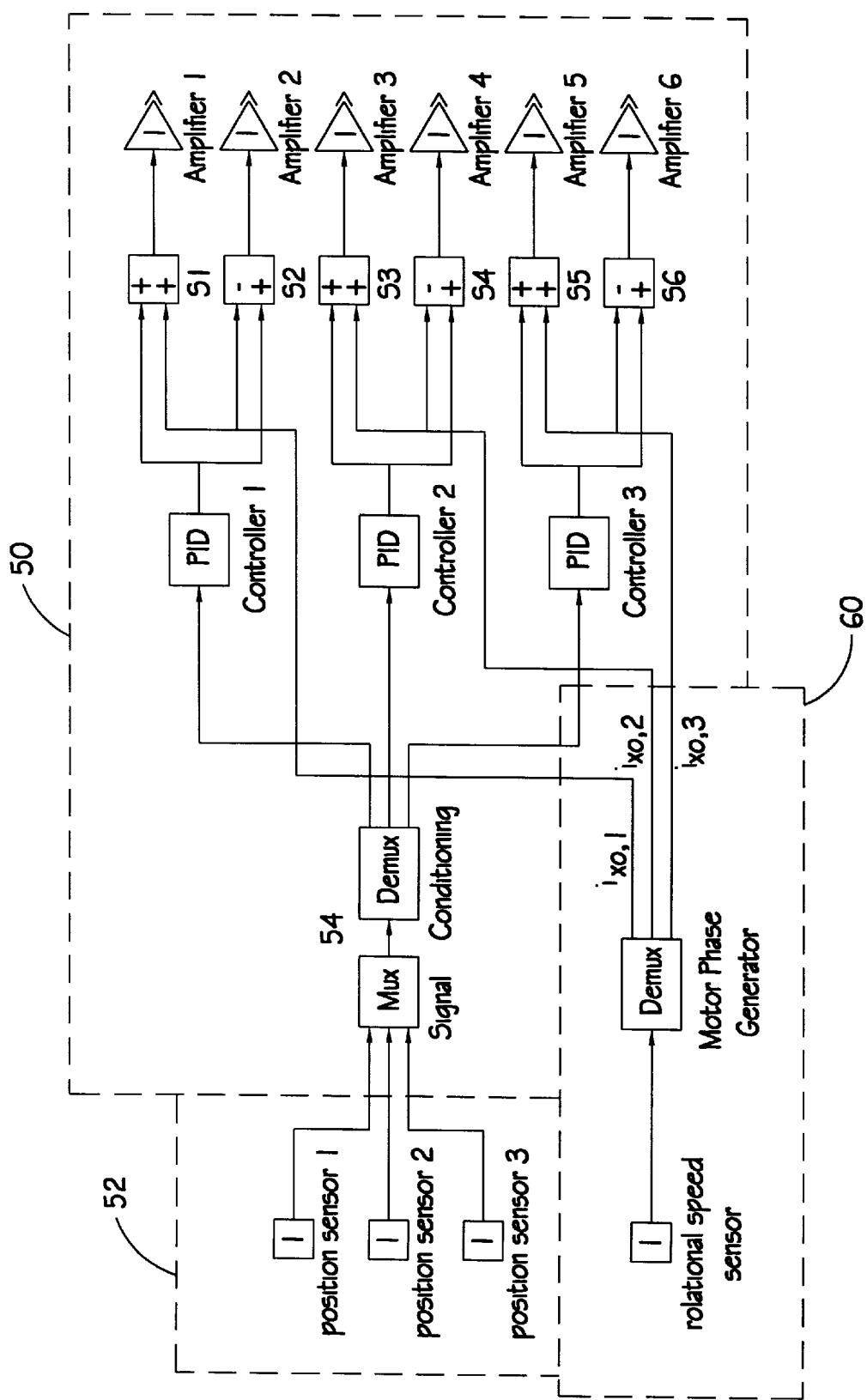
FIG. 4 is a schematic diagram of the active magnetic bearing/motor controller of the present invention.

Referring next to FIG. 4, the figure shows the circuits which are used to establish the currents which both suspend the rotor between the stators and the section which is used to cause motor rotation. Referring back to the basic analysis given with respect to FIG. 1, it can be seen that the current $i_x$ is the current which creates the electromagnet forces which are used to suspend the rotor between the stators. These currents are generated in the upper section 50 of the circuits of FIG. 4. The current through the electromagnets is modified based on the input 52 from a plurality of sensors 24 of the inductive, capacitive, optical or other contact-free type supported on each of the stators 20. (See FIG. 2). At least three sensors 24 are provided, each closely adjacent one of the sets 34 of three electromagnets. By using three sensors, any tilt in the rotor relative to the stator can be detected, as well as monitoring the distance X of the rotor to the stator. This measurement is converted to a signal which is conditioned in a signal conditioning section 54 and then converted to the three-individual currents $i_x$ which are applied to the magnets.

The currents $i_{o1}$, $i_{xo2}$, $i_{xo3}$ which cause the rotation of the motor are generated in accordance with known principles in the section 60, with the outputs of section 60 being imposed on each of the three $i_x$ currents which are the inputs to each of the three sets 35 of electromagnets. Thus, by superposing the bias currents 60 on the control currents 50, the same sets of electromagnet can be used for both suspension and rotation. In this case, the magnets are located essentially 120° apart establishing a three-phase motor. It should be noted, of course, that this circuitry of FIG. 4 is only an example. It is not meant to limit the scope of the invention in any way; any type of known controller which is capable of supplying appropriate currents to a set of electromagnets in an active magnetic bearing would be an appropriate controller for this system.

Figure 5A:
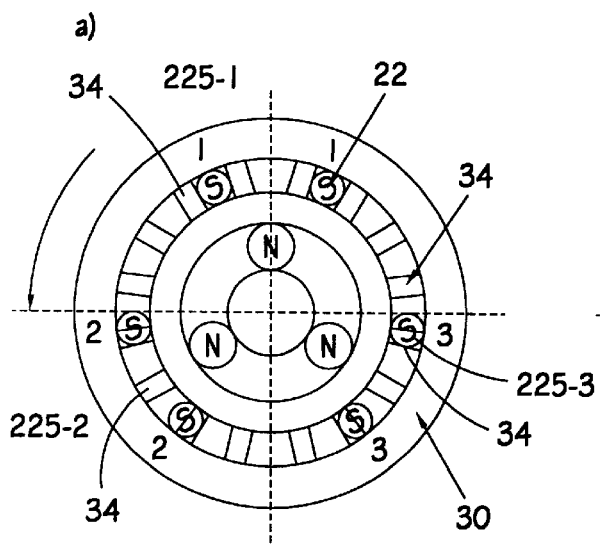
Figure 5B:
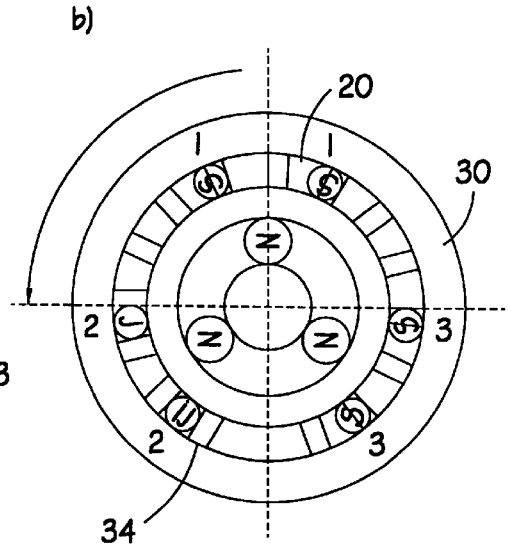

Finally, it should be noted that there is a reason that the inner ring of the rotor is used for suspension only, whereas the outer ring is used for suspension and rotation. The rationale is that the inner ring 32 is solid material which provides the maximum effect in interacting with the electromagnets 22N in order to suspend the rotor very accurately between the two stators. In contrast, the outer ring, being located further toward the edge of the disc, has the maximum effect in interacting with the currents $i_{xo}$ for causing rotation of the rotor. FIGS. 5A and 5B illustrate the interaction between the electromagnets 22 and the slots 36 of the ring 34 to create rotation of the rotor. Referring first to FIG. 5A, it can be seen that the top set of electromagnets 22S-1 are vertically aligned between a pair of slots 36. The electromagnets 22S-2 each trails an associated slot 36 taking into account the direction of rotation. And the electromagnets 22S-3 each precedes an associated slot 34 taking into account the direction of rotation. At the next moment in time, it can be seen how now the electromagnets 22S-2 are aligned between slots 36 and the positions of the other electromagnets relative to the slots have also been adjusted. Thus, while the slots 36 are regularly spaced around the ring of which they are a part, the electromagnets which are providing the driving radial force are separated by 120° so that a constant radial force to create a constant speed of rotation is established between the flux circulating between the electromagnets 22 on the stator and the slotted ring of magnetic material on the rotor.

Figure 5C:
Figure 5C:
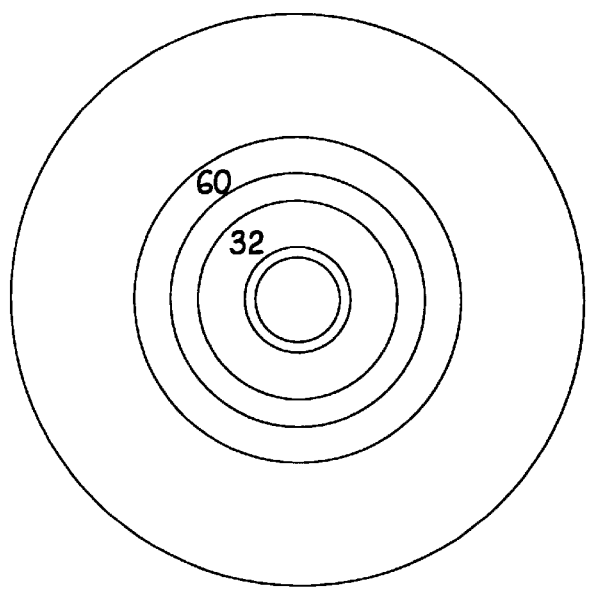

FIG. 5C is simply intended to illustrate that, according to this invention, both the inner and outer rings of magnetic material could be used solely for purposes of stabilization of the rotor without making an effort to incorporate a motor into the rotor.

In this way, a highly stable design is established. The stability of a design is shown, for example, with reference to FIGS. 5D–5G. In FIG. 5D, the active electromagnets 22 are shown on the stator, axially aligned over the ring 32 of magnetic material. This causes the lines of flux shown in FIG. 5D to directly, axially flow between the ring of material 32 and each of the magnetic poles 22. Should some force or shock cause the rotor 30 to be misaligned with the electromagnets of the stator, as shown in FIG. 5E, then the lines of magnetic flux, illustrated in FIG. 5G, will immediately cause a force to be imposed on the rotor, the force being represented by the arrow F3 in FIG. 5G, which would cause the rotor to immediately be brought back into its desired alignment with the stator. Thus, this same design can be used to provide a very stable, active magnet system which recovers very rapidly and responsively from any shock or disturbance.

Figure 6A:
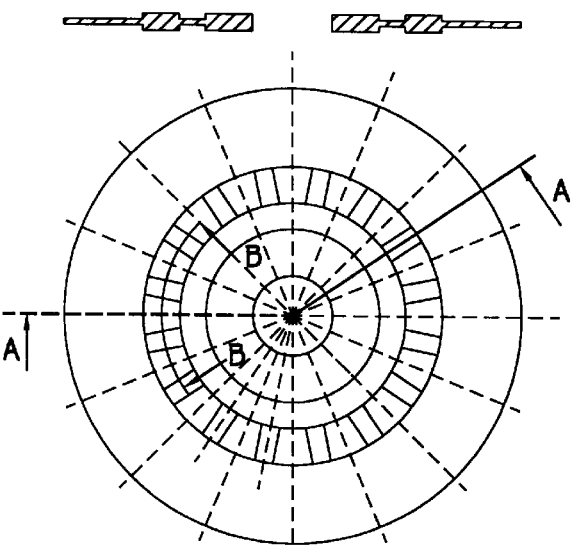
FIGS. 6A–6D show structural details of the rotor and stator of this design.
Figure 6B:
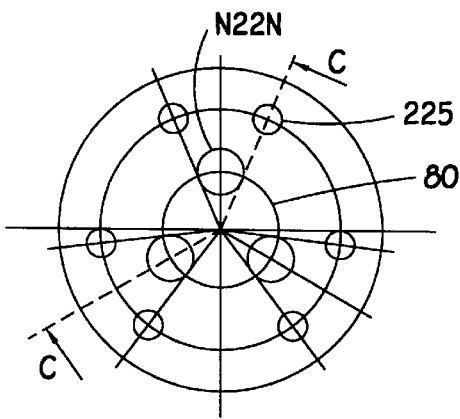
Figure 6C:
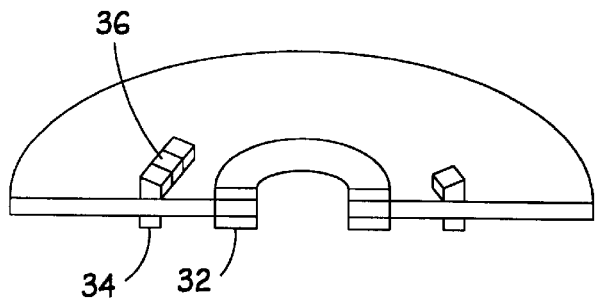
Figure 6D:
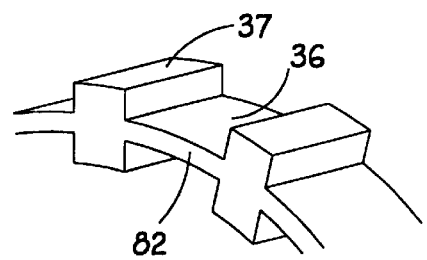

Referring next to FIGS. 6A, 6B, 6C and 6D, these figures show further details of the physical structure of the stator core (shown without the flat coils in FIG. 6B) and the rotor with the slots necessary for use of the system as a reluctance drive as shown in FIG. 6A. FIG. 6B shows the stator core with the poles 22 previously identified in a discussion of 2A, but without the coils wound on these poles. It does show that each set of three poles will be regularly spaced 120° apart, and along two difference radii. The inner radius 80 for the larger poles 22N on inner radius 80 have a larger radius cross-section because they are used to give the rotor its stability; The poles 22S of smaller radius cross-section which are used to provide primarily the drive in rotation to the rotor, although they also add to the stability of the system. Relative widths of these poles 22N and 22S appears in the associated cross-sectional view of FIG. 6B.

FIG. 6A also shows the rotor as previously described with respect to FIG. 2A. It also has a first section A—A which appears in FIG. 6C and which shows that the internal ring 32 of magnetic material which is used for suspension only is a continuous ring, while the outer ring 34 does comprise alternating segments of the ring with slots 36. As shown in more detail in FIG. 6D, which taken along section line B—B of FIG. 6A, these slots in the outer ring which are effective for generation of rotary torque by means of variation of the bias current in the three sets of opposing magnet preferably do not extend all the way through the rotor plate. Rather, these slots have a small piece of material 82 at the center of each slot; it has been found by experimentation that lacking this center piece of material, it is difficult to center the rotor.

Figure 7:
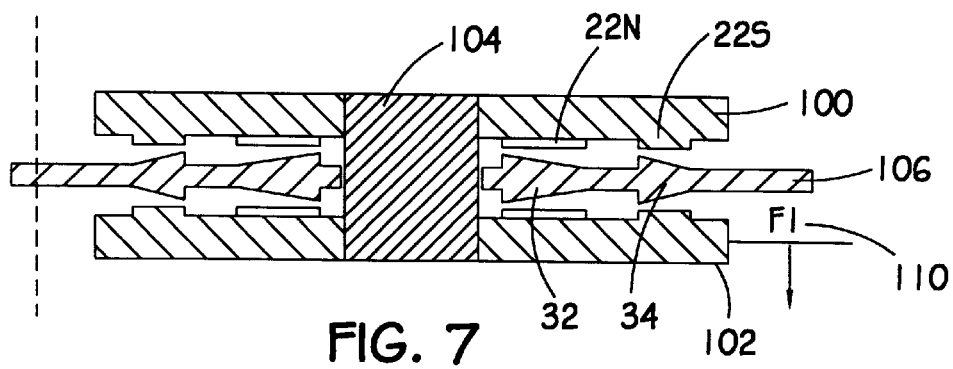
FIGS. 7–10 are vertical sectional views of alternative embodiments of the invention.

FIGS. 7, 8, 9, and 10 show alternative arrangements of the rotor and the stator, both in terms of the cross-section of the rotor, and the mounting of the stator relative to the rotor, to achieve different design goals. Referring first, for example, to FIG. 7, this shows a pair of stator plates 100, 102 both of which are supported from a central post 104. A rotor 106 rotates between the stator plates. Active control of the axial position of the rotor 106 between the stators 100, 102 is achieved in the same way as previously described with respect to the embodiments of FIG. 2. Active control in the radial direction requires an additional sensor 110 mounted from at least one of the stators, to track the radial position of the rotor relative to the stators, and to provide a feedback signal to the control system previously discussed. In order to optimize the radial positioning, both the inner and outer magnetic rings 32, 34 of the rotor are conically tapered in the radial direction as are the faces of poles 22 that they face. In this way, the rotor when in its optimal position is balanced and held in place radially; as previously described with respect to FIGS. 5D–5G, any radial displacement of the rotor relative to the stators will be quickly corrected by the forces imposed by the stationary active electromagnets supported on the stator.

As can be seen from an inspection of FIG. 4, the active electromagnets on the stator can be separately controlled so that the position of the rotor relative to the stator could be very accurately adjusted. Further, this system also lends itself to active damping of the rotor system, with any movement of the rotor in the radial direction immediately detected and damped out by appropriate control signals through the control system of FIG. 4.

Figure 8:
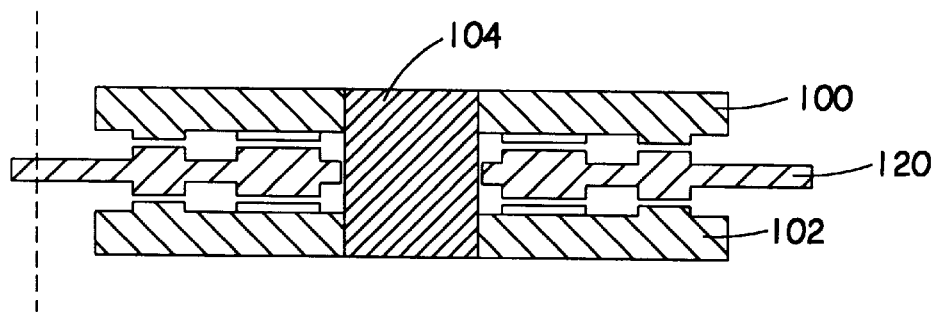

Referring next to FIG. 8, it can be seen that the stators 100, 102 are again mounted from a central post 104. In this case, since no tapering of the rotor 120 is utilized, the active control would again be only in the axial direction, with passive stabilization of the movements of the rotor in the radial direction. This design is substantially the same as shown in FIG. 2B above, and explained previously.

Figure 9:
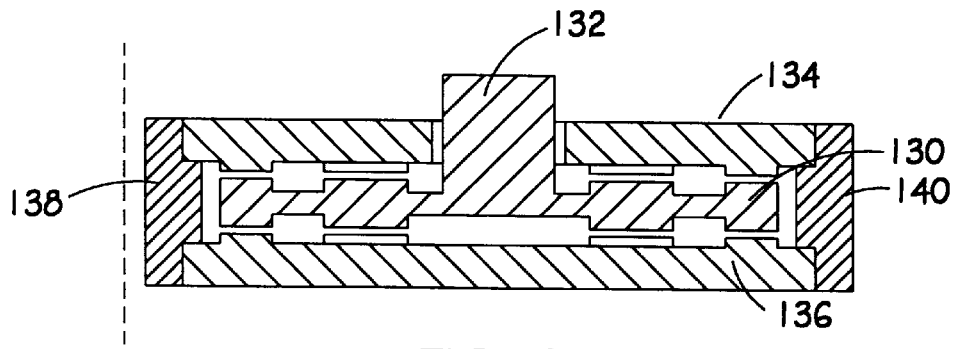
Figure 10:
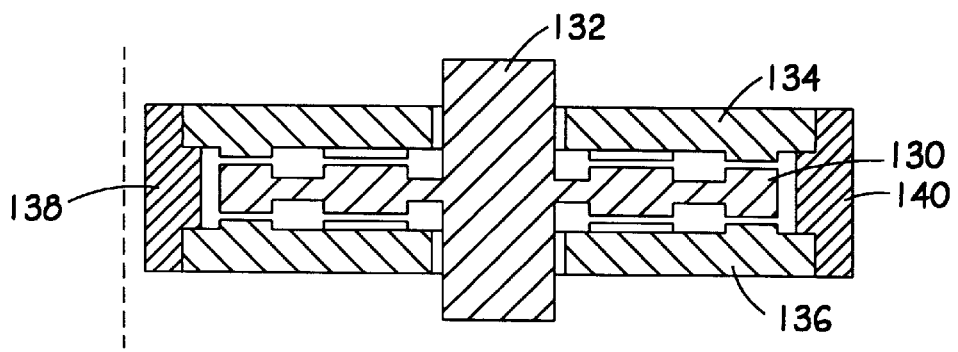

FIG. 9 shows a design in which the rotor 130 is directly mounted to a shaft 132 which rotates with the rotor between stator plates 134,136. Since the stator plates are not supported from the central post, end plates 138,140 must be incorporated to maintain the stability of the stator plates relative to the rotor. This system does provide a highly stable system, with a torque output on the shaft which extends through and axially beyond one of the stator plates 134. A related alternative is shown in FIG. 10 which again shows stator plates 134,136 mounted between end plates 138,140 and supporting for rotation a rotor 130 which again is supported from a central shaft 132. In this case, the shaft extends axially beyond both of the stator plates, providing a torque output on both sides of the motor of this embodiment.

Figure 11A:
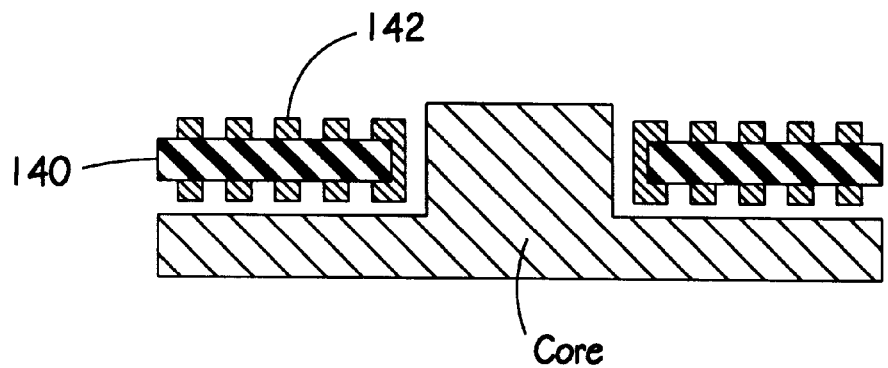
FIGS. 11A–11C illustrate alternative methods of fabricating the coils for the electromagnets.
Figure 11B:
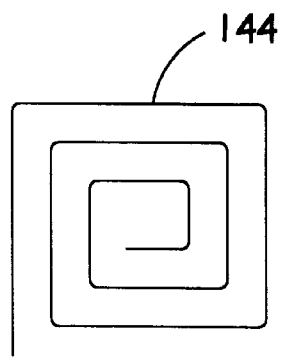
Figure 11C:
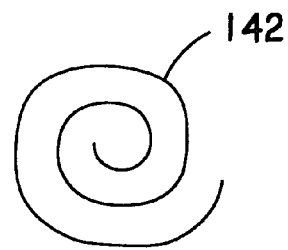
Figure 12:
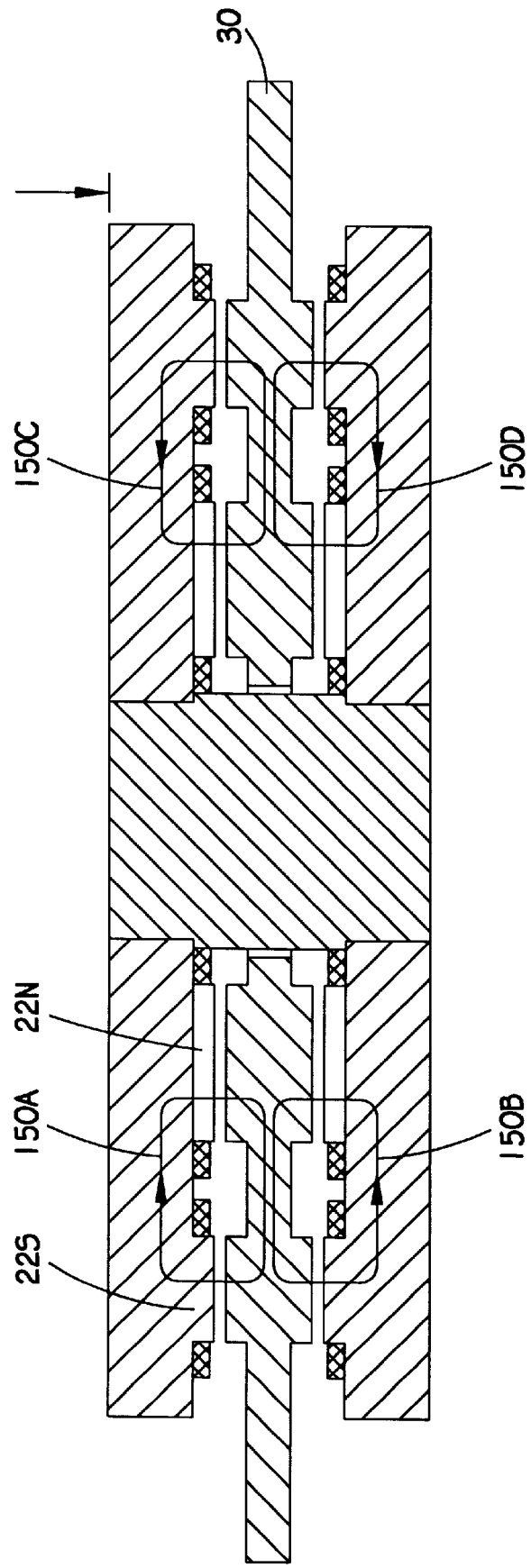
FIG. 12 illustrates the flux circulation in one embodiment of this invention.

Some manufacturing techniques useful in producing especially the stator of the present invention will be discussed with respect to FIGS. 11A, 11B, and 11C. The planar rotor and the cores which support the coils, can be stamped out of solid material; in lower volumes, they can be made with electrodischarge machinery, both as is well known in this technology. The coils could be manufactured on printed circuit boards including flexible printed circuit boards such as the board 140 shown in FIG. 11A, supporting the coils 142. A top view of this spiral coil 142 is shown in FIG. 11C. An alternative would be a square-shaped coil 144 as shown in FIGS. 11B which could also be integrated on a flexible printed circuit board. Finally, FIG. 12 is an enlarged view of the rotor/stator combination shown in FIG. 7 as well as in FIG. 2A. In this figure, both the inner electromagnets labeled 22N and outer circle of magnets, here labeled 22S which are used to form the three or more sets of coils are clearly shown. The rotor 30 is also shown with the flux distribution indicated by the arrows 150A–D, representing the flux paths which implement both the suspension and rotation of this invention.

As described above, the rotation is achieved because three phases are introduced through variations in the bias currents of the three opposing pairs of magnets. In the reluctance motor, the direction of magnetization remains constant on the rotor and stator over a full resolution. Alternatively, a pm synchronous motor can also be realized. However, since the direction of magnetization changes, additional sensors are necessary. The present design will have a number of advantages over known designs in that the complete suspension-propulsion unit can have a very flat aspect ratio. Further, since the design is contact-free, there is no wear and no friction loss. It is known that wear and lifetime issues are particularly severe restrictions on micro-actuators, limitations which are avoided by the present design. Further, very high rotational speeds are possible, higher than what is possible without a contact-free suspension.

In summary, the motor/active bearing combination structure of the invention can be controlled, and contact-free suspension achieved in six mechanical degrees of freedom with a minimum of six electromagnets. One translational (direction of axis of rotation) and two rotational (rotation around the axis perpendicular to the axis of rotation) degree of freedom are controllable with active feedback while the system remains stable in the radial direction. If desired, the radial motion can be actively controlled by introducing inclined poleshoes on the stator, and correspondingly inclined bases on the interacting sections on the rotor as illustrated in FIG. 7.

Among the many advantages of this invention over the prior art are that the stator and rotor can be made of solid material without it creating excessive power losses. Further, the system is suitable for clean and vacuum environments, as lubricants have been eliminated. It is especially adaptable to mass productivity, and utilizes a minimum of sensors and actuators. The design includes a small number of parts to assemble, compared to conventional macro-scale motors: a base plate, insulation layers with embedded elements (coils for actuators, coils and conductors for inductive, hall, or any current sensors, electrodes for capacitant sensors, or photosensitive layers for optical position sensors). The manufacture of a design is independent of sacrificial layer etching, compared to conventional micro-machined motors. Further, it is possible to combine optimal materials for each function. The most suitable magnetic material can be used for the base without requiring material compatibility in the chemical fabrication process.

The design has high heat conductivity due to the flat design, and can be easily expanded to a larger diameter version. The stator-base and rotor can be physically aligned at high accuracy. The higher tolerances for the mechanical design are possible. And finally, as already spelled out, very high accuracy of the rotor positioning is possible due to active feedback. Due to the design, a number of fabrication technologies are possible. For the rotor, electrodischarge, electroplating, coining, or milling may be used; the same fabrication techniques may be used for the stator. Finally, the coils may be formed using multilayer printed circuit board, electroplating or conventional winding.

Figure 13:
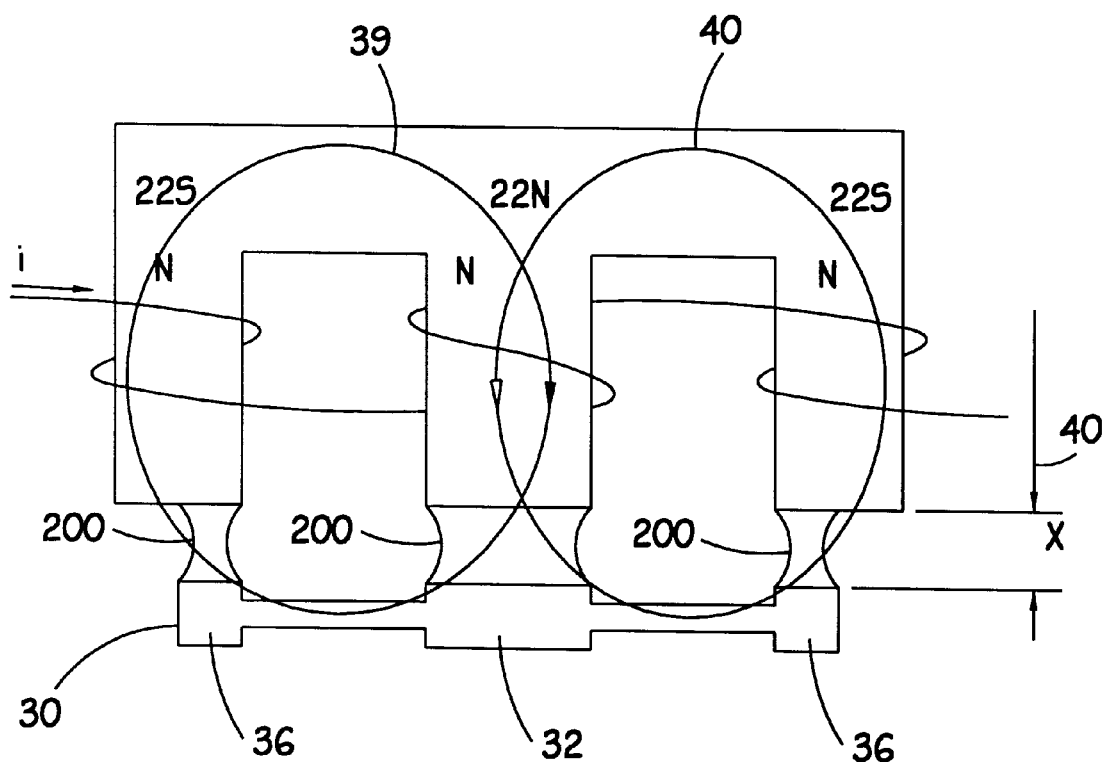
FIG. 13 illustrates the use of ferromagnetic fluid to enhance flux distribution in the invention.

A further alternative improvement of the present design is shown in FIG. 13. A ferromagnetic fluid 200 may be utilized to increase the reluctance force and add damping for the active magnetic bearings. As shown, by utilizing ferromagnetic fluid between the poleshoes 22 and the rotor 30, where the ferromagnetic fluid has a relative magnetic permeability M>1, (preferably in the range of 1.2–4 or higher) an increased attractive reluctance force without changing the power consumption is achieved. Further, it is possible to actually combine the advantages of hydrodynamic bearings with active magnetic bearings by utilizing the ferromagnetic fluid between the rotor and stator.

Also, in each set 35 of magnets, the positions of the N and S poles could easily be reversed; further, only one of each of the N and S poles need to be used in each set.

Other features and advantages of the present invention may become apparent to a person in the skill of the art who studies the present invention disclosure. Therefore, the scope of the present invention is to be limited only by the following claims.

What is claimed is:

1. An active magnetic bearing comprising first and second axially aligned stator plates formed on magnetic material, each of said plates supporting three or more sets of poleshoes for forming active magnetic bearings on each said stator, each said set including a first poleshoe on a first radius of said stator and two poleshoes on a second radius of said stator, and a winding around each said poleshoe to be energized to establish said magnetic bearing, and a rotor capable of being suspended axially between said first and second stator plates and including first and second rings of magnetic material at radial positions aligned with said first and second radii of said stators to form complete flux paths for said magnetic bearing and cause said rotor to be suspended between said stators when said windings are energized.

2. An active magnetic bearing as claimed in claim 1 wherein said first radius is less than said second radius.

3. An active magnetic bearing as claimed in claim 2 wherein said three sets are spaced about 120° apart around their respective said radii.

4. An active magnetic bearing as claimed in claim 1 wherein a single wire provides current to all windings in each of said sets of windings.

5. An active magnetic bearing as claimed in claim 1 wherein said ring of magnetic material at said second, outer radius is regularly interrupted by sections of thinner material or slots so that said active magnets at said second radius of said stator interacts with said slotted ring on said rotor to caused rotation of said rotor.

6. A magnetic bearing as claimed in claim 5 including controllers for providing current to said windings on said first and second pole shoes to suspend said rotor and to provide current to said windings on said second pole shoe to rotate said rotor.

7. A magnetic bearing as claimed in claim 6 wherein at least said first and second rings of magnetic material taper radially away from a central axis of said magnetic bearing so that a radial position of said rotor may be actively controlled.

8. A magnetic bearing as claimed in claim 7 wherein said poleshoes are tapered radially and substantially symmetrically with said rotor rings of magnetic material to enhance active magnetic positioning of said rotor.

9. A magnetic bearing as claimed in claim 5 wherein said stators are supported together at their outer circumference to establish a stable framework for said bearing.

10. A magnetic bearing as claimed in claim 9 wherein said rotor is mounted on a shaft which extends through at least one of said stators.

11. A magnetic bearing as claimed in claim 9 wherein said rotor is mounted on a shaft extending through both of said stators.

12. A magnetic bearing as claimed in claim 1 including ferromagnetic fluid between said poleshoes on each said stator and said rings of magnetic material on said rotor to increase the reluctance force between the rotor and the stator.

* * * * *